Patented Nov. 10, 1925.

1,560,949

UNITED STATES PATENT OFFICE.

RICHARD STÜSSER, OF KOLN-DEUTZ, GERMANY, ASSIGNOR TO FARBENFABRIKEN VORM. FRIEDR. BAYER AND CO., OF LEVERKUSEN, NEAR COLOGNE-ON-THE-RHINE, GERMANY.

AZODYESTUFF.

No Drawing.   Application filed April 15, 1924. Serial No. 706,755.

*To all whom it may concern:*

Be it known that I, RICHARD STÜSSER, a citizen of Germany, residing at Koln-Deutz, in the State of Prussia, Germany, have invented new and useful Improvements in Azodyestuffs, of which the following is a specification.

My invention relates to new and valuable azodyestuffs for cotton having most probably the formula:

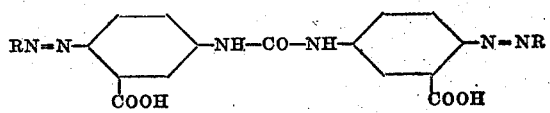

(R meaning an azodyestuff component) which by an aftertreatment on the fibre with metal salts for instance copper or cobalt salts yield shades generally from yellow to violet to green very fast to light and to washing.

The process for their production consists in combining the tetrazocompound of the 4.4′-diaminodiphenylurea- 3.3′- dicarboxylic acid having most probably the formula:

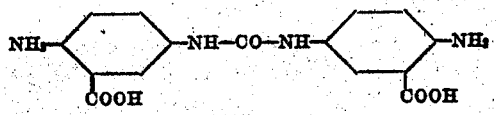

with azodyestuff components. These dyestuffs can also be obtained by combining either the 5-nitro-2-aminobenzoic acid with an azodyestuff component; reducing the nitro group in this azodye to the amino group and finally producing with the aid of phosgene the corresponding urea in the usual manner or by combining the 5-acidyl-amino-2-aminobenzoic acid with an azodyestuff component, splitting of the acidyl group and afterwards treating these azodyestuffs with phosgene.

My new dyestuffs are after being dried and pulverized in the shape of their alkali metal salts generally yellowish to black powders soluble in water and in concentrated sulfuric acid generally with from a yellow to violet coloration. They yield upon reduction with stannous chloride and hydrochloric acid, 4.4′- diaminodiphenylurea- 3.3′- dicarboxylic acid and aromatic amines.

In order to illustrate my invention more fully, the following example is given, the parts being by weight:—

*Example 1.*—330 parts 4.4′- diaminodiphenylurea - 3.3′ - dicarboxylic acid are tetrazotized in the usual manner with 138 parts of sodium nitrite and 500 parts of hydrochloric acid 19½° Bé. To the resulting tetrazo solution 378 parts of 1-meta-aminophenyl - 3 - methyl - 5 - pyrazolon dissolved in water and hydrochloric acid are added and then this solution is rendered alkaline with sodium carbonate. After the formation of the dyestuff is complete it is salted out, filtered off and dried. The dye is after being dried and pulverized in the shape of its sodium salt a brownish powder soluble in water with a yellow coloration and in concentrated sulfuric acid with a yellow coloration. It yields upon reduction with stannous chloride and hydrochloric acid 4.4′ - diaminodiphenylurea - 3.3′ - dicarboxylc acid and 1-meta-aminophenyl-3 - methyl - 4 - amino - 5 - pyrazolon. It dyes cotton directly yellowish-red shades which when aftertreated with copper sulfate change into orange shades very fast to light and to washing.

*Example 2.*—330 parts of 4.4′-diaminodiphenyl urea - 3.3′ - dicarboxylic acid are tetrazotized in the usual manner with 138 parts of sodium nitrite and 500 parts of hydrochloric acid 19½° Bé. To the resulting tetrazo solution 204 parts of 1-phenyl-5 - pyrazolon - 3 - carboxylic acid dissolved in a solution of sodium acetate are added and then sodium acetate is added to neutralize the mineral acid and leave the solution weakly acid with acetic acid and after the formation of the intermediate product is complete it is rendered alkaline with sodium carbonate. 207 parts of aceto-acetic-ortho-anisidide:

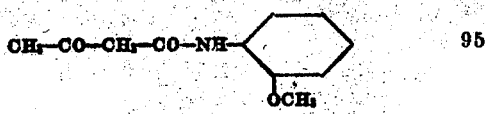

dissolved in water and caustic soda solution are then added. When the reaction is complete the dye is salted out, filtered off and dried. The dye is after being dried and pulverized in the shape of its sodium salt a brownish powder.

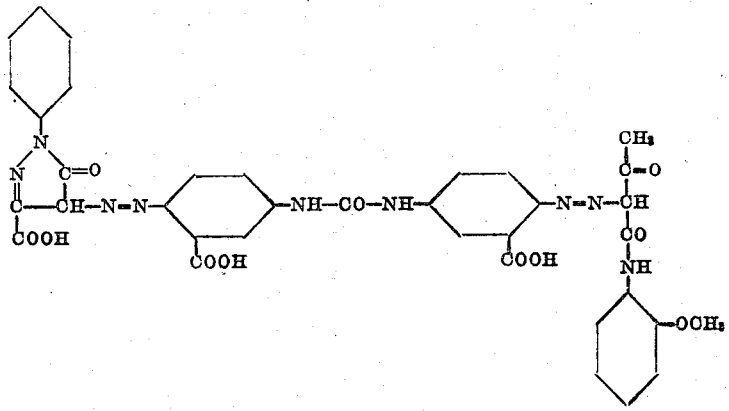

It dyes cotton directly yellowish-red shades which when aftertreated with copper sulfate change into brown shades very fast to light and to washing.

*Example 3.*—330 parts of 4.4'-diaminodiphenyl-urea-3.3'-dicarboxylic acid are tetrazotized in the usual manner with 138 parts of sodium nitrite and 500 parts of hydrochloric acid 19½° Bé. To the resulting tetrazo solution 221 parts of aceto-aceticanilide-para-carboxylic acid dissolved in water and sodium carbonate are added and then sodium acetate is added to neutralize the mineral acid and leave the solution weakly acid with acetic acid. The aceto-acetic-anilide-para-carboxylic acid has the formula:

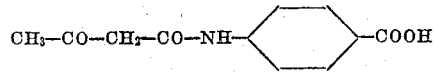

After half an hour's stirring the solution is rendered alkaline with sodium carbonate. Subsequently 207 parts of aceto-acetic-orthoanisidide in glacial acetic acid are added and the mixture is rendered alkaline. After the formation of the dyestuff is complete it is filtered off and dried. The dye is after being dried and pulverized in the shape of its sodium salt a yellowish-brown powder.

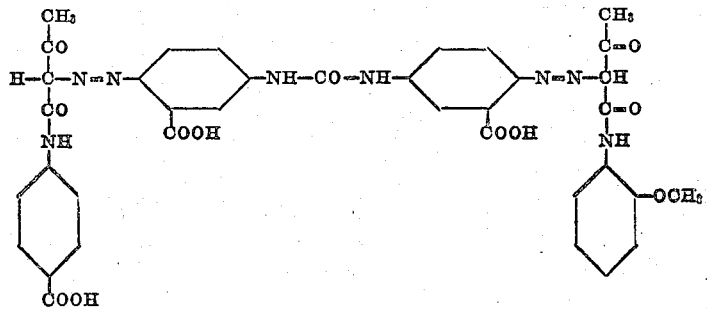

It dyes cotton directly yellow shades which when aftertreated with copper sulfate change into greenish-yellow shades very fast to light and to washing.

I claim:—

1. The herein described new azodyestuffs, which are after being dried and pulverized in the shape of their alkali metal salts yellowish to black powders soluble in water and in concentrated sulfuric acid generally with from yellow to violet coloration, yielding upon reduction with stannous chloride and hydrochloric acid 4.4'-diaminodiphenylurea-3.3'-dicarboxylic acid and aromatic amines; dyeing cotton generally from yellow to violet to green shades, which when aftertreated with metal salts yield shades very fast to light and to washing, substantially as described.

2. The herein described new azodyestuff having most probably the formula

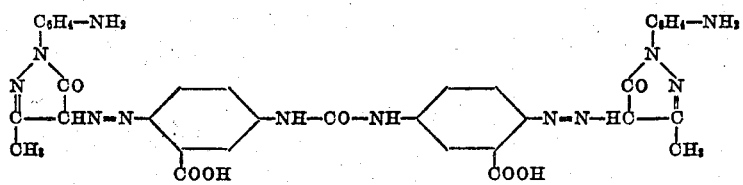

which is after being dried and pulverized in the shape of its sodium salt a brownish powder soluble in water with a yellow coloration and in concentrated sulfuric acid with a yellow coloration, yielding upon reduction with stannous chloride and hydrochloric acid 4.4'-diaminodiphenyl-urea-3.3'-dicarboxylic acid and 1-meta-aminophenyl-3-methyl-4-amino-5-pyrazolon; dyeing cotton yellowish-red shades which by an after-treatment with copper sulfate change into orange shades very fast to light and to washing, substantially as described.

In testimony whereof I have hereunto set my hand.

RICHARD STÜSSER.